March 9, 1926.
J. NOLLA
OVEN CLOSURE
Filed March 28, 1925
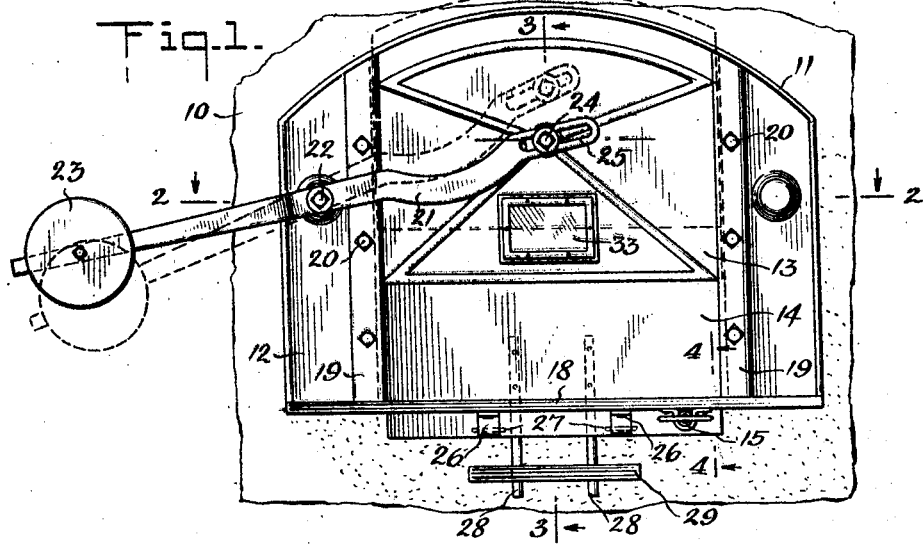
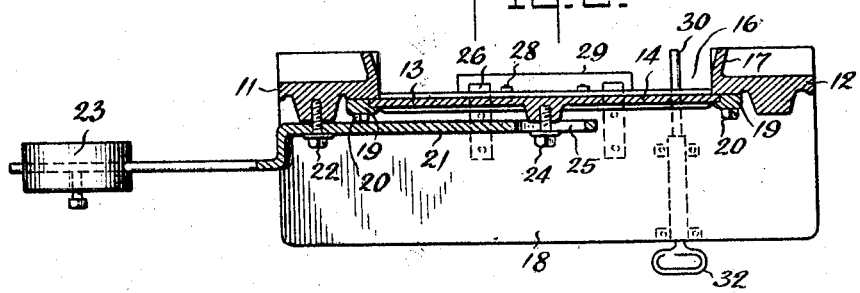
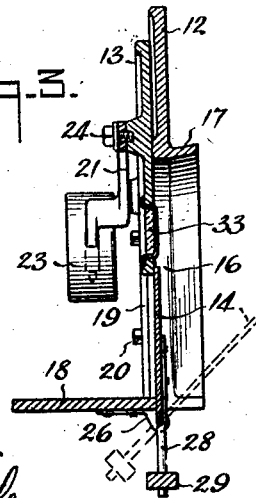
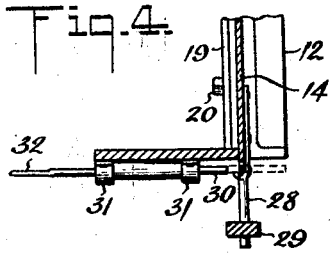
WITNESSES
INVENTOR
James Nolla
BY
ATTORNEYS Patented Mar. 9, 1926.

1,576,451

UNITED STATES PATENT OFFICE.

JAMES NOLLA, OF NEW BRUNSWICK, NEW JERSEY.

OVEN CLOSURE.

Application filed March 28, 1925. Serial No. 19,153.

*To all whom it may concern:*

Be it known that I, JAMES NOLLA, a citizen of Spain, and a resident of New Brunswick, in the county of Middlesex and State of New Jersey, have invented new and useful Improvements in Oven Closures, of which the following is a full, clear, and exact description.

This invention relates to closures of the type used in conjunction with bake ovens for controlling the entrance opening of the baking compartment.

Under certain conditions the maximum thermal efficiency of a bake oven is incapable of attainment due to the fact that inadequate closures are provided which do not prevent the escape of heat during the introduction of the goods to be baked into the baking compartment and during the withdrawal of the baked goods from the baking compartment. Oven closures comprising solely the use of a self-closing door continually uncover an area of the oven opening which is greater than an opening required for introducing comparatively small goods, such as cakes, pies and tarts, as distinguished from bread which is of considerably greater bulk and height. Much heat is permitted unnecessarily to escape in the use of such type of door alone. Closures employing slidably mounted doors solely, while capable of controlling the extent of the baking compartment opening to be uncovered, have to be continually adjusted or moved to suit the introduction of goods of different sizes to be baked. This necessity for a continual movement of the sliding door is a drawback and requires unnecessary time and labor.

It is, therefore, the prime object of the present invention to provide a closure for bake ovens which will include essentially a pair of co-operative doors capable of controlling the opening of the oven in a manner to suit the introduction of goods of various sizes to the oven to prevent the unnecessary escape of heat.

Another object of the invention is to provide a closure of the character mentioned which will include a door adjustably mounted at the oven opening to control the extent to which the opening is uncovered and alone capable of completely closing said opening, and a self-closing door which co-operates with the first-mentioned door and which permits the ready introduction of the goods to be baked to the baking compartment through said opening.

With the foregoing and other objects in view, the invention resides in the particular provision, relative disposition, and operation of the parts hereinafter fully described and illustrated in the accompanying drawing, in which:

Figure 1 is a front elevation of a portion of a bake oven with the closure of the present invention applied thereto;

Fig. 2 is a horizontal sectional view taken on the line 2—2 of Fig. 1 and looking in the direction indicated by the arrow, with the closure detached;

Fig. 3 is a vertical transverse sectional view taken on the line 3—3 of Fig. 1, looking in the direction indicated by the arrows, the closure being detached;

Fig. 4 is a detail sectional view taken on the line 4—4 of Fig. 1 and showing the locking means for the self-closing door.

Referring now more particularly to the several views of the drawing, it will be apparent that in Fig. 1 the closure of the present invention is shown applied to an oven, a portion of which is shown at 10, at the opening of the baking compartment thereof, and in the other figures the closure in its several sectional views, is shown detached from the oven. Generally speaking, the closure 11 consists of a mount 12, a weight-controlled slidably mounted door 13, a weight-controlled self-closing door 14, and locking means 15 for locking the door 14 in closed and opened positions. The mount 12 is in the nature of a casing, and is provided with a central opening 16 surrounded by a flange 17 and a platform or rest 18, which extends out at a right angle and is horizontally disposed and forms the lowermost part of the mount. As stated, the door 13 is slidably mounted, and this is accomplished by the employment of grooved strips 19, which are attached to the mount by studs 20, the strips being arranged, respectively, at opposite sides of the opening 16, and receiving the side edges, respectively, of the door 13. In order to effect a movement of the door 13 to different positions of adjustment, there is provided a lever 21 pivotally mounted by the use of a clamping stud 22 screwed into a part of the mount 12, there being a weight 23 at one end of the lever and the opposite end of the lever being connected to the door 13 by the employment of a stud 24 which passes through a slot 25 in the lever and is screwed into a boss located substantially centrally of the door. The door 14 is arranged at the inside of the mount 12 to control the lower area of the opening 16. The said door 14 is cut out at two points to accommodate the ends, respectively, of bearing brackets 26 secured to the under side of the rest 18, there being pivot members 27 carried by the door which are received, respectively, in the openings, respectively, in the brackets 26 to permit the oscillatory or pivotal movement of the door inwardly to a substantially horizontal position. In order to bring the door to a substantially vertical closed position against side portions of the mount 12, the door 14 has attached thereto by the employment of depending members 28, a weight 29. The locking means 15 which serves for locking the door 14 in its closed and opened positions, consists of a locking bolt 30 slidably mounted in bearings 31 connected to the under side of the rest 18. One end of the bolt 30 has a handle 32 and the opposite end thereof is adapted to be extended through an opening in the lower edge of the door 14. By withdrawing the locking end of the bolt 30 from the opening in the door 14, the latter may be readily swung on its pivots.

From the foregoing it will be apparent that the door 13 may be moved relatively to the door 14 so that both doors will co-operate in such a manner as to suit the introduction of goods of various sizes to the baking compartment of the oven to prevent the unnecessary escape of heat. When goods, such as pies, tarts and flat cakes, are to be baked, the door 13 may be moved so that the lower edge thereof will be close to the rest 18, while the door 14 controls that portion of the opening 16 which is not covered by the door 13. The goods may be readily introduced on a peel, which when brought into contact with the door 14, moves the same to an opened position. Upon the withdrawal of the peel, the door 14 automatically closes. It will therefore be understood that no more of the opening 16 is uncovered than is absolutely necessary. When goods of greater bulk and height, such as bread, are to be baked, the door 13 may be readily adjusted to increase the area of the opening, and the door 14 will function as before mentioned. As shown in the several figures, the door 13 is at its maximum height for the introduction of goods of greater bulk as to height, although the door 13 may be raised to a still greater degree. The door 13 is provided with a sight opening covered by a glass 33 by virtue of which the goods may be observed during the baking period.

What is claimed is:

1. An oven closure comprising cooperative closure members mounted for controlling the opening communicating with the baking compartment of the oven, one of said closure members being adjustable to close various areas of said opening and capable of completely closing said opening independently of the other closure member, means for maintaining the adjustable closure member in different adjusted positions, the other of said closure members being independently movable to opened and closed positions to control the area of said opening not closed by said first mentioned closure member, and means connected to the last mentioned closure member to cause it to move from an opened position to a closed position to combine with the first mentioned closure member to fully close said opening.

2. An oven closure comprising co-operative closure members mounted for controlling the oven opening in a manner to suit the introduction of goods of various sizes to and their removal from the oven to prevent the unnecessary escape of heat, one of said closure members being self-closing and being independently movable to opened and closed positions, the other of said closure members being of a size to completely close said opening independently of the self-closing closure member.

3. An oven closure comprising co-operative closure members mounted for controlling the oven opening in a manner to suit the introduction of goods of various sizes to and their removal from the oven to prevent the unnecessary escape of heat, one of said members being movable to opened and closed positions and being self-closing, and means for locking said self-closing closure member in opened position.

4. An oven closure comprising co-operative closure members mounted for controlling the oven opening in a manner to suit the introduction of goods of various sizes to and for removal from the oven to prevent the unnecessary escape of heat, and means for effecting the movement of one of said closure members to and for maintaining the same in different positions of adjustment with respect to the other closure member, said closure member being capable of completely closing said opening independently of the other closure member.

5. An oven closure comprising co-operative doors mounted for controlling the oven opening in a manner to suit the introduction of goods of various sizes to and their removal from the oven to prevent the unnecessary escape of heat, one of said doors being slidably mounted, the other door being pivotally mounted and disposed behind the first-mentioned door so as to open inwardly in response to pressure exerted thereon, means for effecting the sliding movement of the slidably mounted door to and for maintaining the same in different positions of adjustment with respect to the other door, and means for automatically causing the closing of said pivotally mounted door.

6. A closure comprising a mount having an opening therethrough, a door slidably mounted on said mount at said opening, means for effecting the movement of the sliding door and for holding said door in different positions of adjustment, a second door pivotally mounted on said mount at said opening, means for normally holding the second door in a closed position and allowing the pivotal movement of the same to an opened position, said slidably mounted door being of a size to cover the whole of said opening.

JAMES NOLLA.